United States Patent [19]

Loveness et al.

[11] Patent Number: 4,956,762
[45] Date of Patent: Sep. 11, 1990

[54] CONTROLLED SWITCHED BRIDGE-BASED POWER RECONFIGURING APPARATUS

[75] Inventors: Harlan K. Loveness, Beavercreek; Robert P. Lewis, Hillsboro, both of Oreg.

[73] Assignee: S-V Technology, Inc, Portland, Oreg.

[21] Appl. No.: 297,500

[22] Filed: Jan. 13, 1989

[51] Int. Cl.⁵ .............................................. H02M 7/00
[52] U.S. Cl. ........................................ 363/65; 363/70; 363/71; 307/82
[58] Field of Search ...................... 307/58, 82; 363/43, 363/65, 67, 70, 71

[56] References Cited

U.S. PATENT DOCUMENTS

| 3,579,081 | 5/1971 | Bates | 363/65 |
|---|---|---|---|
| 3,581,212 | 5/1971 | McMurray | 363/43 |
| 3,614,589 | 10/1971 | Ireland et al. | 363/72 |
| 3,648,149 | 3/1972 | Brown et al. | 363/64 |
| 3,691,449 | 9/1972 | Feltmah | 363/72 |
| 3,750,004 | 7/1973 | Walker | 363/72 |
| 3,767,996 | 10/1973 | Bates | 363/72 |
| 3,832,619 | 8/1974 | Pollard | 363/65 |
| 3,867,643 | 2/1975 | Baker et al. | 363/43 |
| 4,032,832 | 6/1977 | Miller | 363/72 |
| 4,052,657 | 10/1977 | Kleiner et al. | 363/43 |
| 4,131,936 | 12/1978 | Gemp | 363/43 |
| 4,159,515 | 6/1979 | Walkowiak | 363/55 |
| 4,161,771 | 7/1979 | Bates | 363/71 |
| 4,200,908 | 4/1980 | Kalinichenko et al. | 363/71 |
| 4,240,135 | 12/1980 | Schaefer, III | 363/43 |
| 4,270,163 | 5/1981 | Baker | 363/43 |
| 4,315,163 | 2/1982 | Bienville | 307/66 |
| 4,370,702 | 1/1983 | Shuey et al. | 363/42 |
| 4,370,703 | 1/1983 | Risberg | 363/71 |
| 4,399,499 | 8/1983 | Butcher et al. | 363/17 |
| 4,476,520 | 10/1984 | Gallemore | 363/43 |
| 4,695,933 | 9/1987 | Nguyen et al. | 363/71 |

Primary Examiner—Peter S. Wong
Assistant Examiner—Jeffrey Sterrett
Attorney, Agent, or Firm—Edward B. Anderson

[57] ABSTRACT

An apparatus for reconfiguring power comprises a four-bridge network. Each bridge is controlled by complementary switch pairs driven by three-state control signals. One state provides for system shut-down and the other states provide for bridge operation. Reconfiguration is achieved by retrieving one of a plurality of patterns of switch signals to produce a desired output. The switch patterns are changed to maintain a desired output for a varying input.

5 Claims, 8 Drawing Sheets

CONTROLLED SWITCHED BRIDGE-BASED POWER RECONFIGURING APPARATUS

FIELD OF THE INVENTION

This invention relates to apparatus for reconfiguring power from one form into another, such as from direct current into alternating current, or vice versa. More particularly, it is related to such an apparatus having a plurality of series-coupled switching bridges which are controlled in half-bridge segments.

BACKGROUND OF THE INVENTION

There are many ways to reconfigure power from one form into another. Reconfiguration from a direct current source into an alternating current source is the most common form. Other ways include converting a DC power source having a varying level into a fixed level DC source, converting alternating current into direct current, and changing the level or frequency of alternating current.

There has developed a need for power reconfiguring systems for independent power generating systems, such as in locations where there is no electrical power available from a public utility, where installations exist which must have an uninterruptible power source, and in locations served by utility power where off-peak utility rates are lower, or where load levelling can reduce utility demand charges.

Electricity for an independent power system can be generated by several methods. Photovoltaic panels (PV solar cells), windmills, waterwheels, and diesel and gasoline generators can all be used. Photovoltaic is becoming the most popular way to generate electricity because it is nonpolluting, does not require refueling, has no moving parts to wear out, and the cost of PV solar cells continues to drop, making PV systems more cost effective. Further, the need for nonpolluting energy sources has dramatically increased in the last few years, especially since the occurrence of recent nuclear accidents around the world and the continuing rise of the cost of electricity generated by public and private utilities.

Photovoltaic panels produce level-varying direct current (DC) electricity. DC power can be stored in batteries for later use. When batteries are drained, the power they release is DC. However, all common household and business machines operate on AC 60 cycle power or 50 cycle power. The user who desires to use existing equipment with standard, ordinary AC wiring, must have a source of AC power, and must convert the DC power into AC. The device to perform simply the conversion of DC power to AC power is commonly called an inverter.

One drawback which has retarded the use of small photovoltaic power systems is the lack of a reliable apparatus to reconfigure the power into clean, undistorted AC power efficiently. Many developments have occurred in the last 20 years as a result of the increasing need to provide independent power sources. As a result, many circuits have been developed which attempt to achieve, for varying applications, the conversion or reconfiguration of power from one form into another. The following is a brief description of some of the many patents which have recently been issued in this area.

U.S. Pat. No. 3,579,081 issued May 18, 1971 to Bates discloses a low frequency sine wave generator circuit having three bridge circuits with each bridge circuit having four switches to generate a voltage pattern to produce a step-wise quasi-sine wave for a load. U.S. Pat. No. 3,581,212 issued on May 25, 1971 to McMurray discloses a fast response stepped-wave switching power converter circuit which includes the use of a feedback signal to offset a reference signal to generate a target signal. The target signal passes through an analog to digital converter and control logic for producing gating signals for the individual bridge switches to keep the output value within a range of values. U.S. Pat. No. 3,614,589 issued Oct. 19, 1971 to Ireland et al. discloses a sine wave static inverter using a logic-based pulse generator and stepped-wave generators with a harmonic analyzer to convert DC power into quasi-sine wave power.

U.S. Pat. No. 3,648,149 issued Mar. 11, 1971 to Brown et al. discloses a polyphase inverter circuit which uses power borrowed from a transformer to achieve polyphase stepped voltages. U.S. Pat. No. 3,691,449 issued Sept. 12, 1972 to Feltman discloses a static inverter having automatic means for providing a highly regulated AC output despite changes in the input DC level. This system uses an integrator charged by input DC level via a static converter and generates inverse signals to separately drive transistor switches of the bridge. U.S. Pat. No. 3,750,004 issued July 31, 1973 to Walker discloses an instantaneous current control for static inverters. This device provides current limiting of three phase AC output from DC input. Control is by adjusting the relative phases of the inverters. U.S. Pat. No. 3,767,996 issued Oct. 23, 1973 to Bates discloses a low frequency multi-phase sine wave generator circuit which uses major and minor three-bridge networks with separate switch control to generate three phase output from DC input.

U.S. Pat. No. 3,867,643 issued Feb. 18, 1975 to Baker et al. discloses an electric power converter having a seven-stage bridge network with logic control for operating each switch. U.S. Pat. No. 4,032,832 issued June 28, 1977 to Miller discloses a DC to AC inverter with unregulated input and regulated output. Regulation is achieved by sensing the output amplitude and comparing it with a reference to shift the phase between bridge outputs. The bridges are controlled by a signal applied to each bridge half with the use of transformers and reverse windings to achieve inverse signals applied to the transistor switches. U.S. Pat. No. 4,131,936 issued Dec. 26, 1978 to Gemp discloses a digital delaying device for use in a symmetrical phase shifting apparatus having a harmonic neutralized system. This system has a four-stage square wave switching circuit which uses phase shifting of a memory using relative delays between reading and writing of data from the memory to generate three phase power.

U.S. Pat. No. 4,159,515 issued June 26, 1979 to Walkowiak discloses an inverter control system which provides controlled start up and shutdown based on low input voltage, high output current and other factors. U.S. Pat. No. 4,161,771 issued July 17, 1979 to Bates discloses an inverter ripple regulator which senses the ripple in an output and uses an internally generated signal to produce an error signal which controls a buck-boost circuit in series with the inverters. U.S. Pat. No. 4,200,908 issued Apr. 29, 1980 to Kalinichenko et al. discloses a device for digital control of a polyphase thyristor-pulse. This circuit uses a clock pulse counter to generate pulse trains to control polyphase thyristor-pulse converters and uses time-shifted pulse trains to vary the phase.

U.S. Pat. No. 4,240,135 issued Dec. 16, 1980 to Schaefer, III discloses a regulated cycloconverter circuit which uses a regulator to add a rectified voltage to the battery source and a microcomputer to control timing of a lower voltage output. U.S. Pat. No. 4,270,163 issued May 26, 1981 to Baker discloses a bridge converter circuit which applies positive and negative input voltages and respective switching of these so that a stepwise alternating current output varying ±2 times the input voltage is achieved. U.S. Pat. No. 4,370,702 issued Jan. 25, 1983 to Shuey et al. discloses microprocessor control of inverter power transistors with DC content correction. This system produces three phase power and has current limit control and pulse pattern generator using a single bridge per phase with two switches for each bridge with individual switch control.

U.S. Pat. No. 4,399,499 issued Aug. 16, 1983 to Butcher et al. discloses a bi-lateral four quadrant power converter which uses direct current to produce alternating or direct current output. A four-switch bridge is controlled using complementary signals generated by inverters. U.S. Pat. No. 4,476,520 issued Oct. 9, 1984 to Gallemore discloses a computer controlled synthetic waveform generator which uses an EMF ring of charge-storage elements with computer controlled switching to achieve the alternating current output.

Most of these prior art devices are actually square wave inverters which produce modified square wave or quasi-sine wave outputs. These outputs are not very close to a smoothed sine wave and thus are frequently "dirty" in that they are unsuitable to operate equipment which provides an inductive load. Although some of these are able to achieve a relatively high efficiency, this is typically under the most favorable conditions while the unit is running at or near its capacity and usually with a resistive load. An inverter was developed by the inventors of this invention and disclosed at a 1985 trade show. The apparatus was operated in a "black box" form with the output displayed on an oscilloscope screen. This device was an improvement over other known devices in that it provided a three bridge circuit with the relative voltage transformation from each bridge being related to the others by a factor of three. Thus, the third bridge produced power which was one-ninth the power level of the main bridge. The bridges were operated in half bridge segments with a single control signal directed to each half bridge with series-coupled switches being operated by actively controlling one of the switches. The other switch then operated by default, taking the reverse operation of the actively controlled switch. Although this device provided a substantial improvement in the "cleanness" of the output sine wave, it was not as ultimately efficient and controllable as is desired. Further, it did not have safety shutdown features which would be necessary in an actual use situation.

SUMMARY OF THE INVENTION

The present invention provides a power reconfiguration apparatus which has increased efficiency of operation and which produces output waveforms having improved noise and distortion characteristics. In one aspect of the present invention, a power reconfiguring apparatus is provided having a capability for preventing operation of any of the configuration bridges when certain conditions are exceeded. The present invention also controls half bridge segments by a single control signal which by the nature of the control or switch driver precludes the conducting of both complementary switch pairs simultaneously.

These and other features of the invention are provided generally in a power reconfiguring apparatus for reconfiguring an input source of power having a voltage of a predetermined amplitude characteristic into an output power source having a voltage of a different predetermined amplitude characteristic. A plurality of switching bridges are coupled in series with each bridge comprising two input terminals coupleable to an input source and two output terminals on which an output power source is generated. Four switches are associated with each bridge for coupling selectively each of the input terminals to each of the output terminals. A generator is associated with each bridge for generating first and second control signals representative of a predetermined pattern of switching of the associated four switches. Each of the first and second control signals is associated with two of the switches of each bridge and exists in at least two states. A switch driver associated with each switch is responsive to the first and second control signals for alternatively opening and closing the switches when the control signals are in the first and second states.

In one aspect of the invention, the generator for generating the first and second control signals is responsive to a third control signal having two states. In this case, the first and second control signals also have a third state which exists when the third control signal is in a first state whereby all of the switches are opened. When the third control signal is in the second state, then the first and second control signals are in the respective first and second states as determined by the first and second control signal generator. The apparatus also includes a generator for generating the third control signal in either the first or second state.

In a further aspect of the present invention, the control signal generator is responsive to a signal indicating a switching pattern corresponding to the desired output power characteristic for storing a plurality of patterns of switching of the switches and outputting the first and second control signals in a pattern determined by the pattern indicating signal. The generator also includes a generator for generating the pattern-indicating signal. In its preferred mode, the pattern-indicating signal is responsive to the voltage characteristic existing on the output terminals for varying the pattern-indicating signal in a manner reducing any difference between the existing voltage characteristic and the predetermined voltage characteristic on the output terminals. In this way, the output power configuration is directly controlled by selecting one of a plurality of patterns directly, rather than manipulating a single fixed pattern. This provides substantial flexibility in controlling the configuration of the output power.

The present invention also provides for secured control of switching of complementary switches in a bridge using a single control signal to the complementary pair by applying the control signal to opposite terminals of associated diodes in the switch drivers. In this way, when one diode is conducting, the other is reversed biased, and nonconducting. It is therefore impossible for the two switches to be closed at the same time.

In yet a further aspect of the present invention, the input and output power sources can have different characteristics. That is in one use of the apparatus, the input may be direct current-based with the output being alternate current-based, or, for instance the input power could be alternating current-based with the output power direct current-based. Thus, a bidirectional reconfiguration apparatus is provided. In its preferred embodiment, this is provided using the combination of stored patterns to reconfigure alternating current into a desired fixed level of direct current power, or vice versa. This is provided by a switch which allows determination of the mode of operation of the apparatus. When alternating current power is input, the selected pattern is synchronized with the input power for generating the output power.

It will thus be seen that the present invention provides for a power reconfiguring apparatus having improved flexibility, and increased efficiency and performance characteristics. These and other features and advantages of the present invention will become more apparent from a reading of the following detailed description of the preferred embodiment when considered with the accompanying drawings.

DETAILED DESCRIPTION OF THE PREFERRED EMBODIMENT

Figure 1:
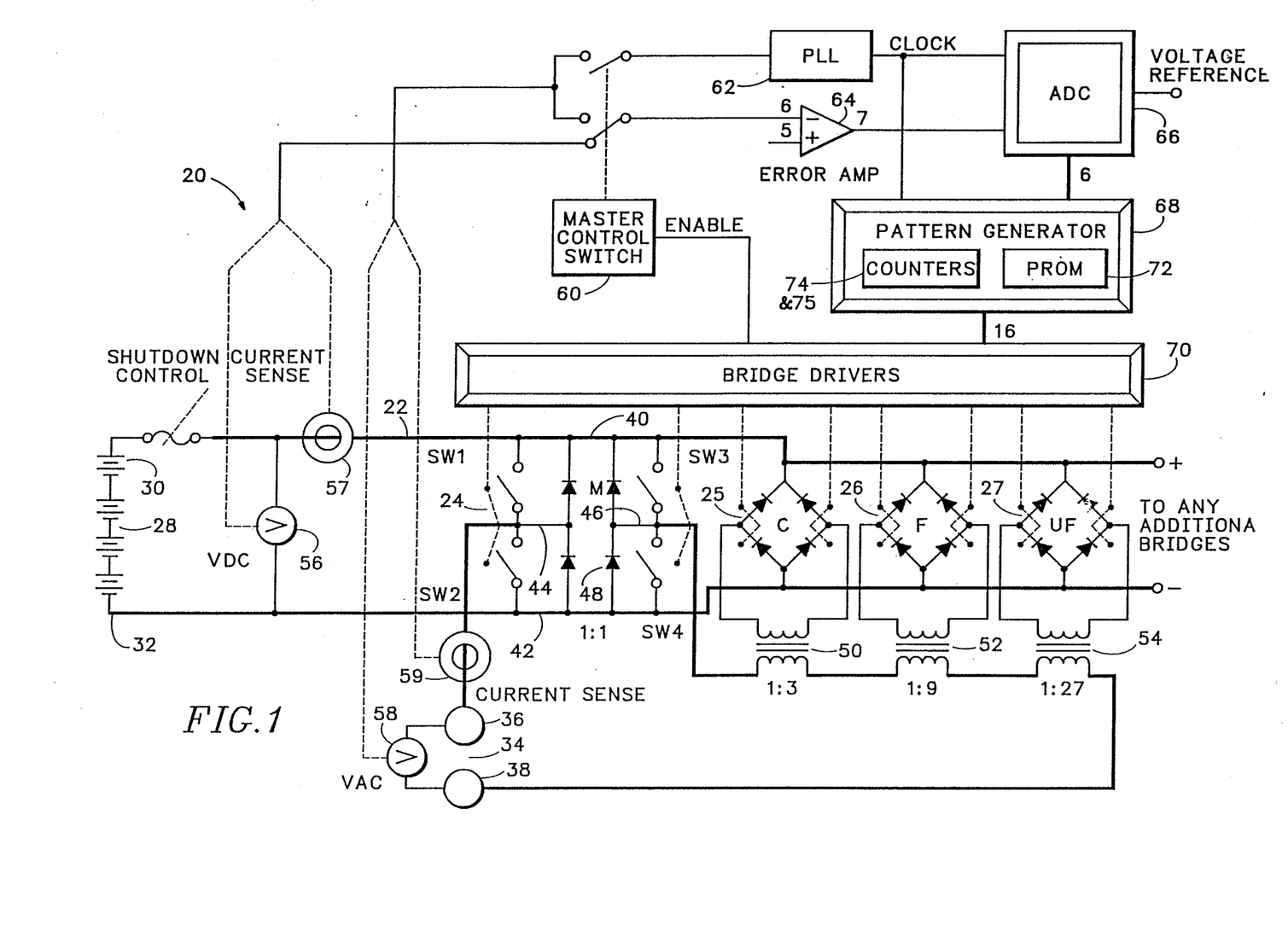
FIG. 1 is a block diagram illustrating a power reconfiguring apparatus made according to the present invention.

Referring initially to FIG. 1 a power reconfiguring apparatus 20 made according to the present invention is shown. Apparatus 20 includes a four-bridge reconfiguration network 22. Network 22 includes bridges 24, 25, 26 and 27. Network 22 is coupled to a DC voltage source 28 at terminals 30 and 32 and to an AC power source 34 at terminals 36 and 38. It will be noted that the DC power source can be either the input or the output and the AC power source correspondingly can be either the output or the input. In the following discussion, it will be assumed that a DC input source is used to generate an AC output source unless indicated otherwise.

Each bridge, such as bridge 24 includes four switches SW1, SW2, SW3 and SW4 which respectively couple one of input DC terminals 40 and 42 to one of the bridge output AC terminals 44 and 46, as shown. Each of these switches has a diode 48 in parallel with the switch.

The output of bridge 24 directly couples its input terminals to a series connection of the four bridges. The output of bridge 24 does not receive any transformation and is therefore a 1:1 voltage reconfiguration. Bridge 25 has a 1:3 ratio transformer 50 and bridges 26 and 27 respectively have 1:9 and 1:27 ratio transformers 52 and 54. The output power level is thus obtained by synthesizing the component power function of the network 22 of transforming devices with transformation ratios of the form $1:a^n$ where n is an integer and a is a real number. In this case, a is equal to 3 and n for transformers 25, 26 and 27, respectively is 1, 2 and 3. The power level can thus be represented by a fourier series (or its reverse) $f(x) = a_0 + \Sigma_1{}^n(a_i \cos 2\pi i x + b_i \sin 2\pi i x)$ where i is an integer and $a_i$ and $b_i$ are constants, and x is a fraction of a period. The component power function can be represented thus by the corresponding component of the fourier series. It will thus be seen that the power weight factor for each bridge is equal to the reverse of the transformer ratio associated with it. That is bridge 24 has a power weight factor of 27, bridge 25 has a power weight factor of 9, etc. Thus the actual weight factor percent for bridges 24–27 are 67.5%, 22.5%, 7.5% and 2.5%, respectively.

The main bridge 24 handles the majority of power and current and is operated at approximately 60 cycle frequency for a 60 Hz system. As the voltage is increased more power is shared by the other three bridges but the current goes down to compensate for it. Bridge 25 operates at approximately a 600 Hz frequency, bridge 26 at 1500 Hz and bridge 27 at 4400 Hz.

Voltmeters 56 and 58 are respectively coupled across DC source terminals 30 and 32 and AC source terminals 36 and 38, respectively for generating corresponding peak-to-peak voltage signals. Alternatively, current sources 57 and 59 can also be used to generate input and output level feedback signals. The signals from these voltmeters (or ampmeters) are coupled into a master control circuit 60. This circuit is used by a user to turn apparatus 20 on and off and to provide controls for disabling the entire system when the output voltage or current exceeds a predetermined value. Further, when the AC source is the input source then the generation of switching patterns for switching the bridge network must be synchronized with the AC input. In this situation the AC input is coupled to a phase lock loop circuit 62, such as a 4046 chip, which also has a built in oscillator for producing a clock signal. In this mode, the DC output voltage sense is fed into an error signal amplifying inverter 64 for input into an analog to digital converter 66, which may be a unit such as a si520. The analog to digital converter is clocked by a clock signal from circuit 62 for converting the error signal from inverter 64 (which may be a unit such as a TL071) for input into the analog to digital converter. When the DC source is the input source and the AC source is the output source, then the mode switch is activated to disconnect the phase lock loop circuit from the voltmeter signal coming from voltmeter 58 and the inverter is coupled to the AC voltmeter signal, as shown by the switch positions in FIG. 1.

Analog to digital converter 66 converts the signal from inverter 64 into a digital signal which then is passed along with the clock signal to a pattern generator 68. Pattern generator 68 converts the digital signal, during normal operation from converter circuit 66 into a pattern output for providing control signals for controlling these switches associated with bridges 24, 25, 26 and 27 through a bridge driver circuit 70.

Inverter 64 takes the reading from either voltmeter 56 or 58 (or ampmeter 57 or 59) and generates an error signal which is compared to a reference voltage to generate a pattern signal for input to pattern generator 68.

Figure 2:
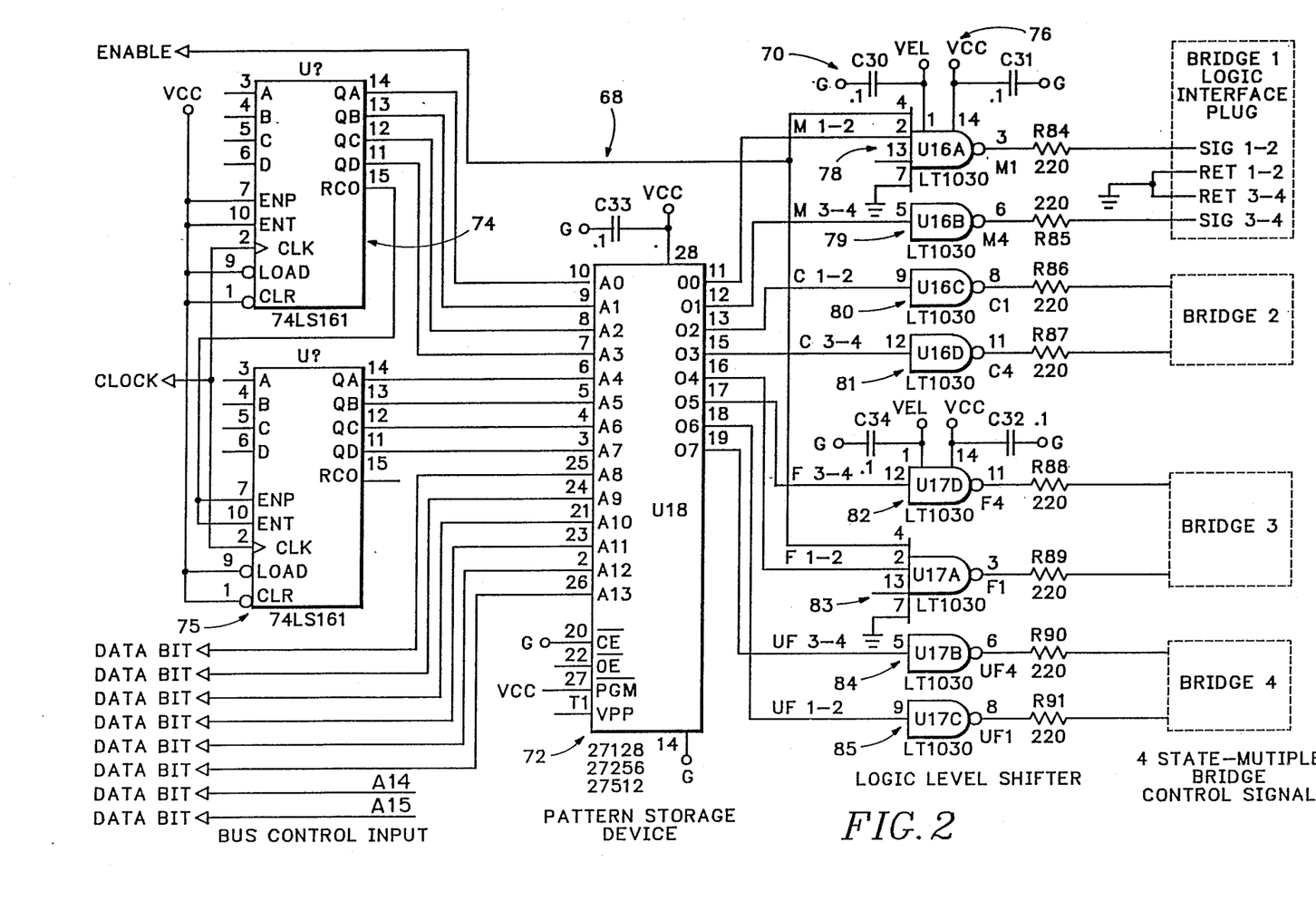
FIG. 2 is a circuit schematic showing the details associated with the pattern generator of FIG. 1.

Referring now to FIG. 2, the structure of pattern generator 68 is shown. Generator 68 includes a pattern storage device 72, such as a27128, 27256, or 27512 chip. This device has the various patterns for controlling the switches in the bridge network burned into it. It includes fourteen address inputs which are used to generate the eight control signals on its output, as shown. The six data bits from converter circuit 66 determine the pattern being used. The eight least significant bits of the address input are determined by a pair of counters 74 and 75 which are driven by the clock signal from the converter circuit. When all of the eight least significant bits are high, the highest output voltage is generated and when they are all low, the lowest output voltage is generated. Intermediate input values produce corresponding output voltage levels as determined by the control signals produced by device 72. Thus the counters, driven by the clock signal, output for every one sixtieth of a second, a full cycle which is broken down into 128 segments. The clock counter signals thus generate a cyclical counting from high to low and back again in order to generate the desired pattern output.

Reference is made to Table I below which shows the individual bridge output conditions, and the resulting voltages assuming a maximum voltage for the main bridge 24 of 135 volts. The actual voltage output of course will depend on the actual input voltage. The pattern shown in Table I is representative of the control signals that would be generated by pattern storage device 72 if the pattern-indicating signal from the analog to digital converter circuit 66 stays at the pattern value corresponding to the pattern shown. The counters then simply count sequentially for the 128 intervals through the addresses corresponding to the interval outputs, with each interval output then generating control signals to produce the bridge conditions shown in Table I. Other patterns are very similar to that shown in the table. For instance, if the output voltage is low, then an alternative pattern is selected which produces, over the duration of the output cycle, a higher voltage level. An output with a higher value is thereby generated. The reverse is true for the converse situation.

The signals output from pattern storage device 72 are at a logic high or logic low states. Each control signal passes through a gate forming a logic level shifting network 76, preferably formed of LT1030 chips. Network 76 forms part of bridge driver circuit 70. Eight gates 78, 79, 80, 81, 82, 83, 84 and 85 convert the logic high and low level signals into corresponding positive and negative currents which activate or deactivate the corresponding switches through switch driver circuits to be described. Each gate 78-85 is also controlled by the enable signal from master control 60 which is required in order to produce an output signal to the switch drivers. This is used for emergency shutdown conditions. When the enable signal goes low the logic level shifting network 76 produces neither positive nor negative signals.

The eight control signals shown at the right in FIG. 2 are directed to the four bridges. Each pair of control signals passes through a set of switch driver circuits, such as circuits 86, 87, 88 and 89 shown in FIGS. 3A and 3B. Each control signal is coupled to a pair of switches, such as switch 1 and switch 2 of bridge 25 through opto-isolators 90 and 92. These optoisolators have opto-isolation diodes 94 and 96 which are connected in a back to back configuration so that the control signal for switch driver 86 is connected to the cathode of diode 94 and is also connected to the anode of diode 96 associated with driver 87. The diodes are low impedance current driven devices and are not subject to voltage noise interference. The diodes can also be driven by fiberoptics, if desired. It will thus be seen that of the associated opto-isolation transistors in the optoisolators only one will conduct and the other will be turned off for any given state (high or low) of the control signal. The optical coupler provides the low power signal for on or off (high or low) values that activates and deactivates corresponding high current FET drivers, such as drivers 98 and 100 (TSC429 or 426). These drivers drive corresponding FETs 102 and 104 which form switches 1 and 2 of one-half of the corresponding bridge. The high current FET driver boosts the power and provides the current needed to control the FET for the fast FET turn on and turn off. Complementary circuitry and corresponding operation also exists and is provided for switch drivers 88 and 89.

Figure 3A:
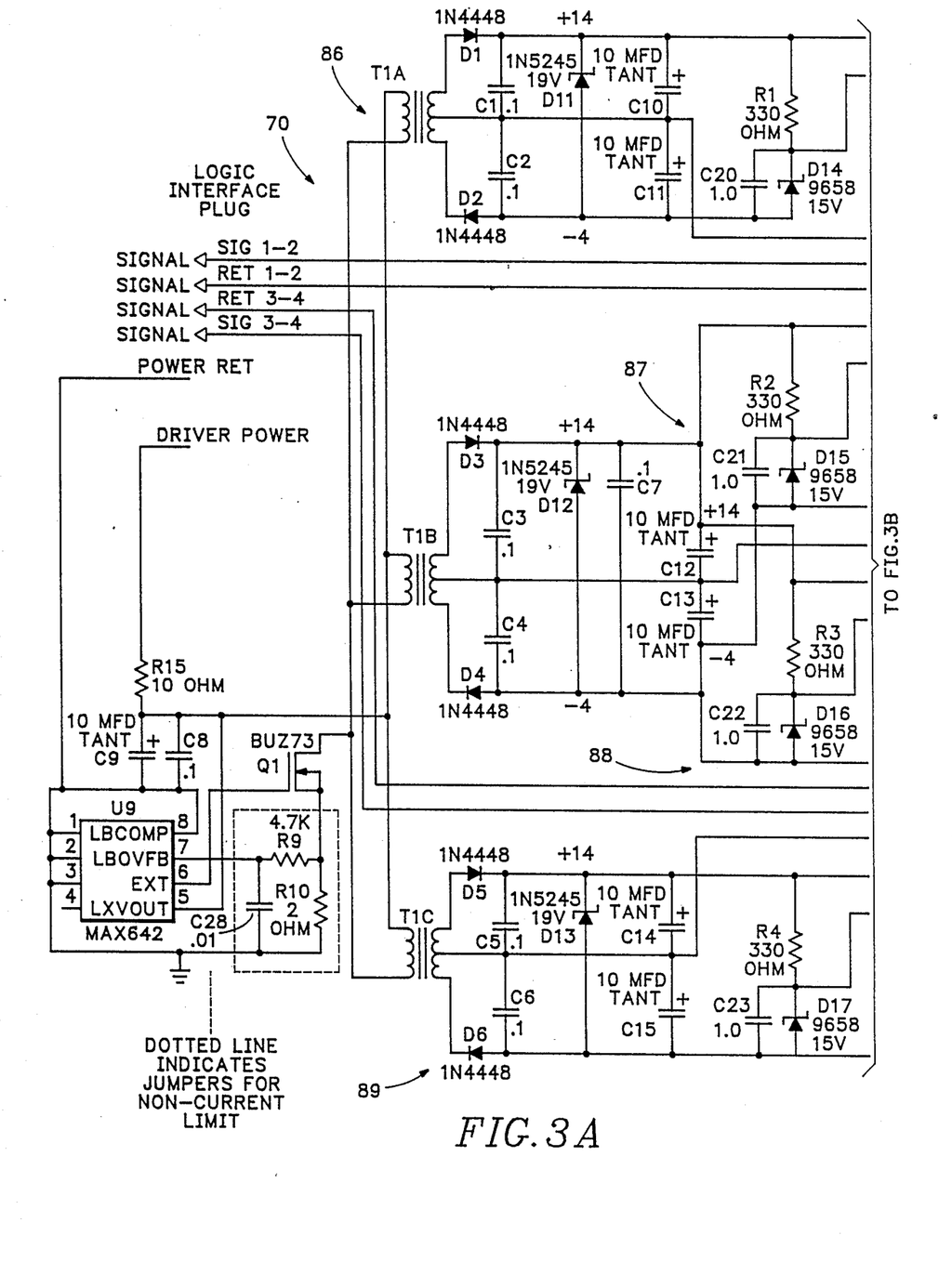
FIGS. 3A and 3B are a circuit schematic showing the bridge drivers and bridge switches associated with one of the bridges of FIG. 1.
Figure 3B:
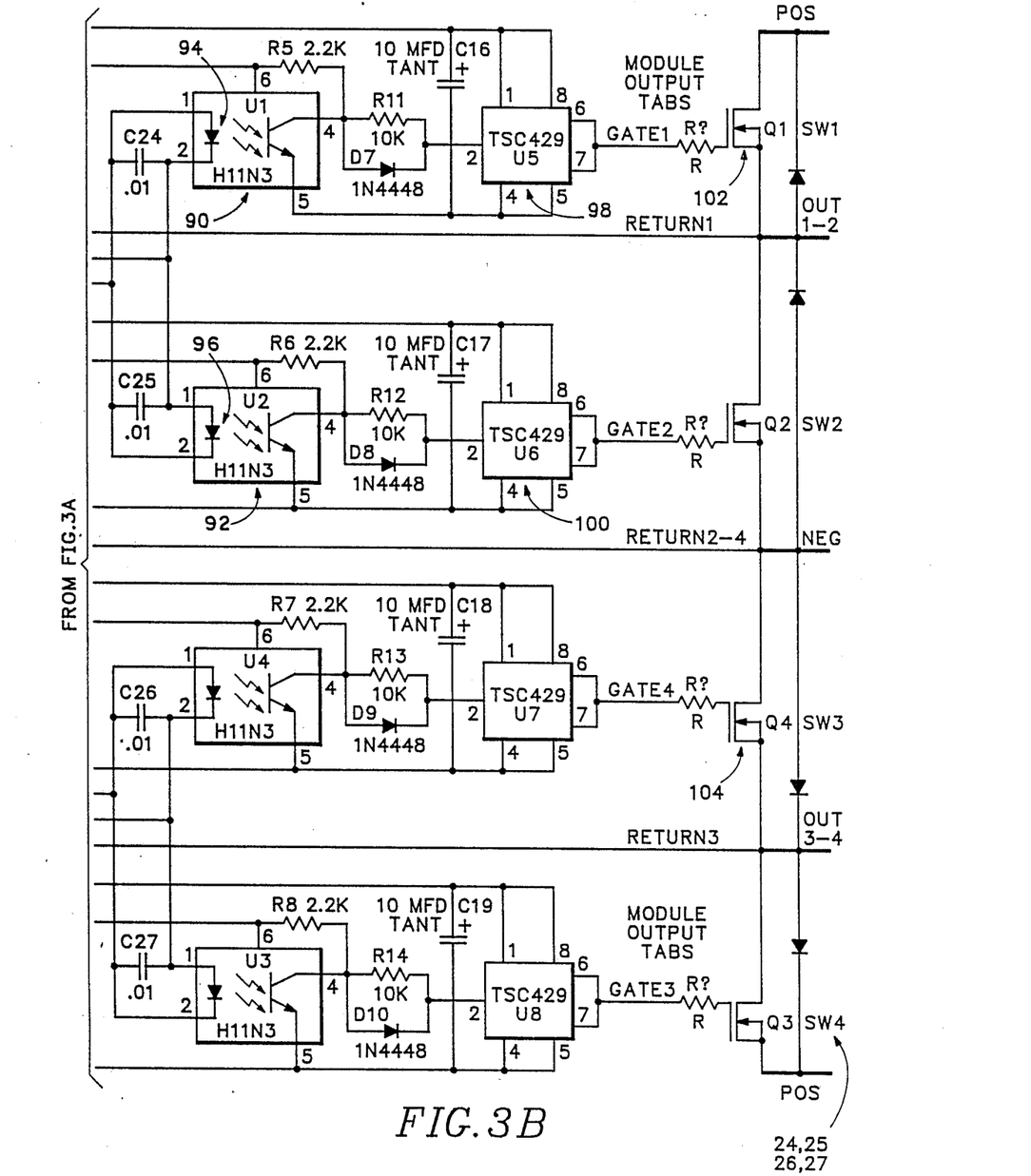

It will be seen that cross-firing of the half bridge pairs is prevented by the optoisolation diode circuit. A positive voltage signal turns on one of diodes 94 and 96 and activates the lower bridge circuit. A negative voltage signal turns on the other diode and activates the upper bridge circuit. When there is no voltage present, neither bridge is on. This is the situation when the logic level shifter network 76 is disabled by the enable signal.

Figure 4:
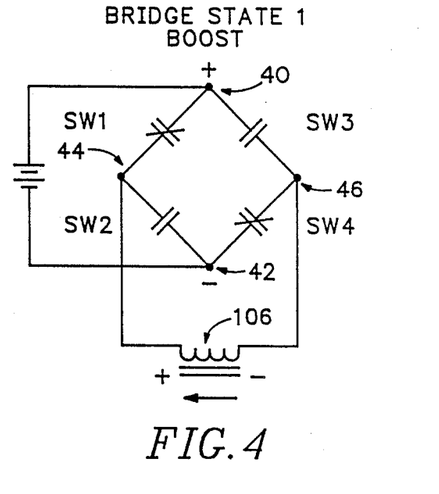
FIGS. 4, 5, 6 and 7 show the four operating states of the bridges of FIG. 1.
Figure 5:
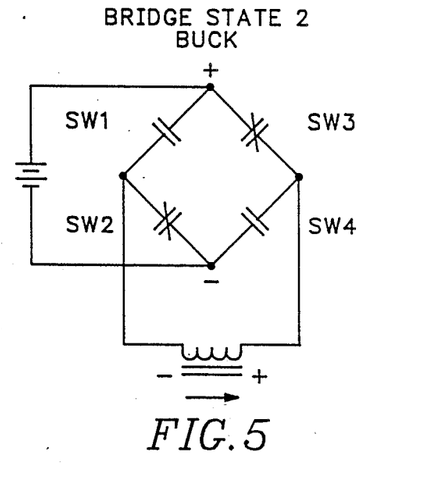
Figure 6:
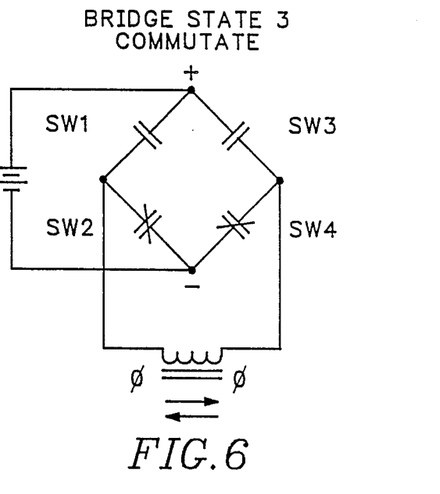

FIGS. 4-7 illustrate the four operating states of each bridge 24, 25, 26 and 27. The normal operating states of the bridges are shown in FIGS. 4, 5 and 6. FIG. 4 shows what is referred to as a boost current or state one condition wherein switches 1 and 4 are closed and switches 3 and 2 are open, thereby producing current to flow in a transformer coil 106 from left to right as shown. A second operating state is shown in FIG. 5 for producing a buck current in transformer coil 106. In this state, switches 1 and 4 are open and switches 2 and 3 are closed, the reverse of the switch positions of FIG. 4. A third operating state wherein no input voltage source is applied to the transformer coil is shown in FIG. 6 as the third state. This is also referred to as a commutating current state since the current flowing in the load is allowed to commutate through the circuit formed by the closing of switches 2 and 4 while switches 1 and 3 remain open. This is necessary since the plurality of bridges which are coupled in series must provide for the flow of current past each bridge even though no positive or negative voltage is being applied to the output in order for the other bridges to be able to conduct as appropriate.

Figure 7:
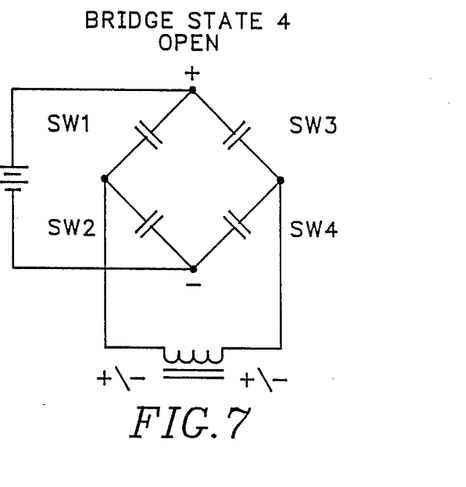
Figure 8:
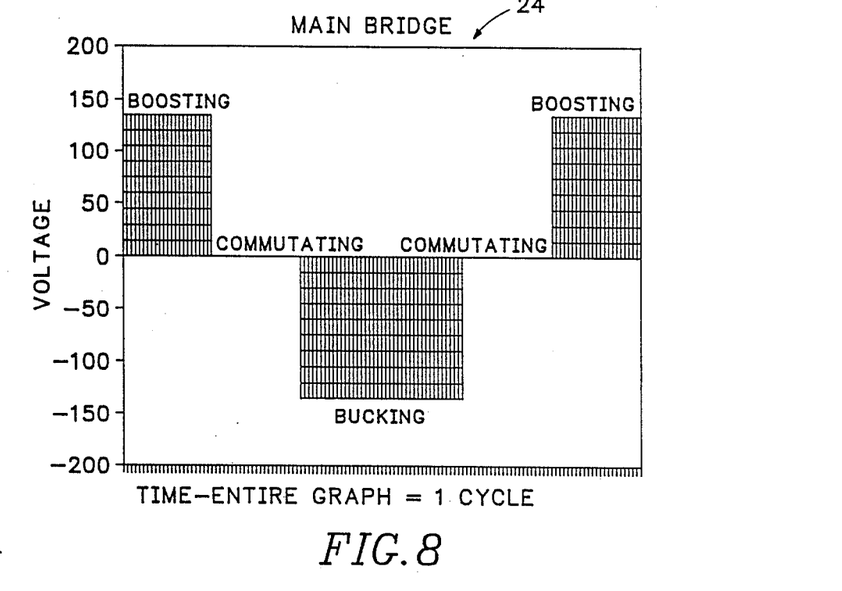
FIGS. 8, 9, 10 and 11 show the respective switching patterns associated with the four bridges illustrated in FIG. 1.
Figure 9:
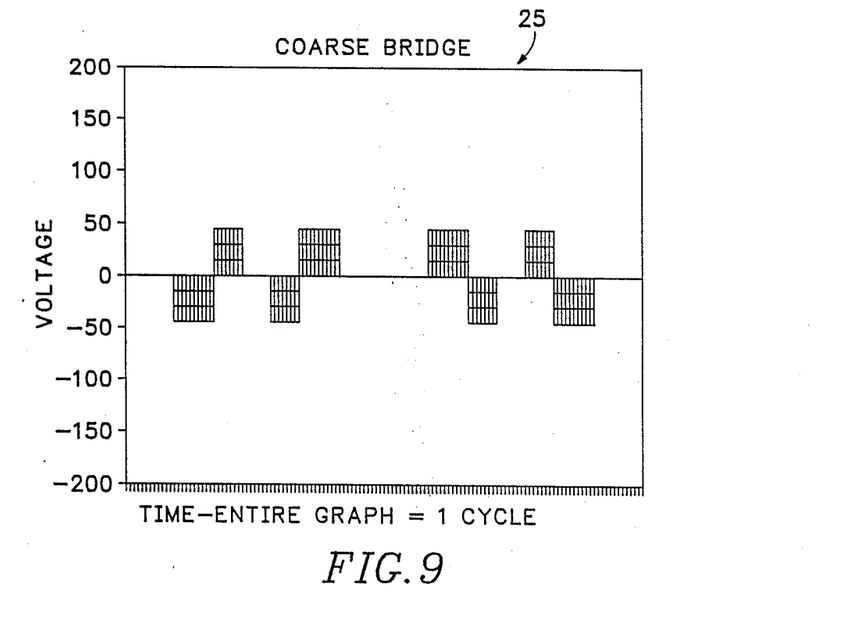
Figure 10:
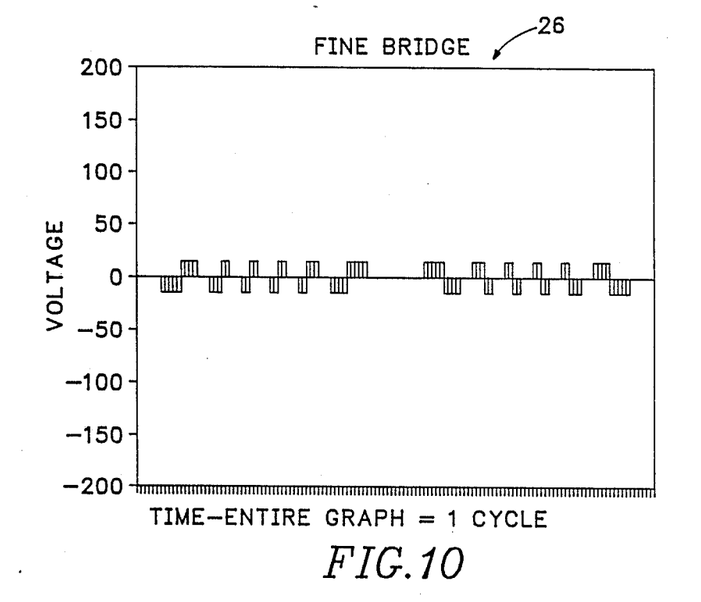
Figure 11:
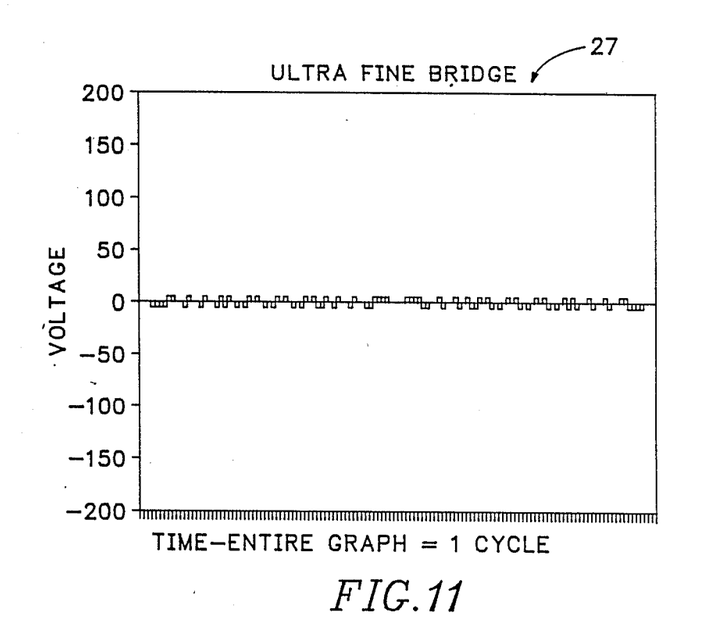

Finally, the fourth or emergency state condition is shown in FIG. 7. In this state all of switches 1-4 are open, thereby preventing any power transfer between any of the input and output terminals of the bridge. This is used for emergency shutdown and is provided by the external enable signal discussed previously with reference to the level shifting circuits 76.

FIGS. 8, 9, 10 and 11 show the resulting outputs of bridges 24-27, respectively in order to generate the pattern determined by Table 1. Bridges 24-27 are also referred to as main, coarse, fine and ultrafine bridges, respectively. It can be seen that main bridge 24 operates for long durations of time in each of the three operating states at approximately a 60 Hz frequency. The course bridge 25 operates at a slightly higher frequency and produces the pulses for generating the voltages for the durations shown. Correspondingly fine bridge 26 and ultrafine bridge 27 are operated at increasing levels of frequency but with progressively decreasing output voltage levels. Thus, the high frequency, low voltage switching, which inherently causes some inefficiencies in the system is at a power level which is already very low, thereby minimizing the impact of the high frequency switching. Each of the figures shows the switching and outputs in order to generate a single cycle for an AC signal, except for FIG. 11 which shows the signals for two sine wave cycles.

Figure 12:
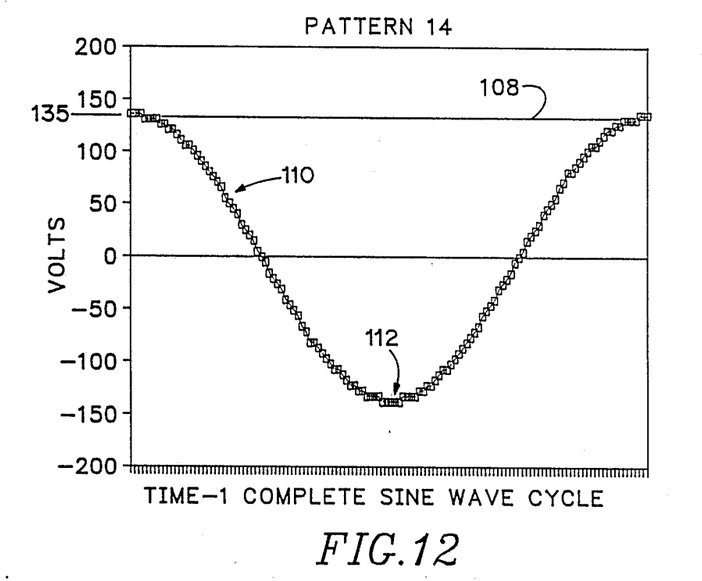
FIG. 12 shows the input and output power configurations for the switching pattern illustrated in FIGS. 8–11.

The resultant output sine wave for a 135 volt input 108 is shown in FIG. 12. The solid smooth line 110 represents the ideal sine wave output and the stepped line 112 represents the total voltage level resulting from the series combination of the four bridges. The voltage steps increment, as provided by ultrafine bridge 27, is approximately 0.8 volts.

Figure 13:
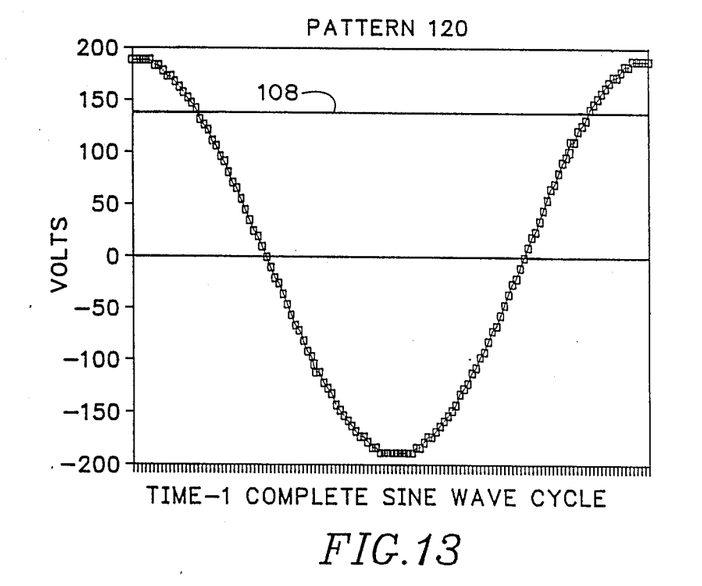
FIG. 13 correspondingly illustrates an alternative generated sine wave resulting from a different pattern than that shown for FIG. 12 for producing a different desired output configuration for the same input.

As a comparison, FIG. 13 shows the corresponding magnitude of the combined output AC signal 114 for the 135 volt DC input signal 108 for a pattern producing a higher magnitude output voltage waveform. This waveform is used when a higher output level is desired, such as when the input DC voltage level drops from that which previously existed.

In the converse situation wherein an AC signal is input, such as when the system is connected to a power utility system for charging a battery pack, a switch from the pattern represented by FIG. 12 to the pattern represented by FIG. 13 would be used where a lower DC output level is desired. This would be the case if the input AC level increased over its previous value. Thus, it will be appreciated that the apparatus 20 shown in FIG. 1 is usable for reconfiguring power going in either direction. That is, AC in or out for DC out or in, respectively. The pattern selection then simply corresponds to the level of the resulting output, with changes in pattern selected in order to maintain the output at a selected level. Thus, the change in level of the input signal is reflected in the output signal, and then the system responds to that change in level in order to return it to a desired output level.

It will thus be seen that the power reconfiguring apparatus 20 made according to the present invention provides power generation which is very close to the desired ideal power output, for either direction of operation. Further, the system incorporates internal shutdown circuits which prevent the bridge network from operating to conduct power in any direction if an emergency exists. It will be appreciated that the various aspects of the present invention can be embodied in other forms of circuit design and configuration. For instance, the operation of the system could be controlled by computer, microprocessor, or microcontroller in order to add additional features to the system described or to vary its application. It will be apparent to one skilled in the art that any such changes in design or detail from the preferred embodiment described will still be within the scope and spirit of the invention as described in the claims.

We claim:

1. A power manipulating apparatus for manipulating an input source of power having a voltage of a predetermined amplitude characteristic into an output power source having a voltage of a different predetermined amplitude characteristic, and operable in a selected one of two states, in a first operating state the input power is characterized as being directed current and the output power is characterized as being alternating current, and in the second operating state the input power is characterized as being alternating voltage and the output power is characterized as being a unipolar voltage, the apparatus comprising:

a plurality of switching bridge means coupled in series, each bridge means comprising two input terminals coupleable to an input power source, two output terminals on which an output power source is generated, and four switch means for coupling selectively each of the input terminals to each of the output terminals;

means for generating, for each bridge means, first and second control signals representative of a predetermined pattern of switching of the associated four switch means, each of the first and second control signals being associated with two of the switch means and having two states; the control-signal-generating means comprising means for generating a signal indicating a pattern corresponding to the desired output power characteristic, and means, responsive to the pattern-indicating signal, for storing a plurality of patterns of switching of the switch means and outputting the first and second control signals in the pattern determined by the pattern-indicating signal; the pattern storing and outputting means comprising an addressable memory means storing the patterns of control signals at predetermined addresses, and the pattern-indicating signal means converting the existing output terminal voltage level into the pattern-indicating signal as a digital signal in the form of an address corresponding to the predetermined pattern of control signals; the means for generating the first and second control signals being responsive to a third control signal having two states, with all of the first and second control signals having a third state when the third control signal is in a first state whereby all of the switch means are open, and the first and second control signals are in the first and second states as determined by the means for generating the first and second control signals when the third control signal is in the second state;

means controllable for generating the third control signal in either the first or second state;

switch driver means responsive to the first and second control signals and coupled to each of the switch means, with the switch driver means associated with a first switch means opening the first switch means and the switch driver means associated with the second switch means closing the second switch means when the corresponding one of the first and second control signals is in a first state, and the first switch driver means closing the first switch means and the second switch driver means opening the second switch means when the corresponding one of the first and second control signals is in the second state; at least one switch driver means comprising a diode means for coupling the corresponding control signal to the associated switch means, with each control signal being coupled to the anode of the diode associated with a first of the pair of switches to which the control signal is coupled, and coupled to the cathode of the diode associated with the second of the pair of switches to which the control signal is coupled, whereby the same control signal forward biases one of the diodes and reverse biases the other of the diodes when in the first state, and reverse biases the one diode and forward biases the other diode when in the second state;

means for sensing the voltage amplitude at both sets of terminals; and switch means operable for selecting the voltage amplitude sensed at the output terminals corresponding to the operating state of the apparatus, the first and second control signal generating means being responsive to the sensed voltage amplitude for generating the pattern of states of each of the first and second control signals;

the pattern-indicating signal generating means being responsive to the output voltage amplitude existing on the output terminals for varying the pattern-indicating signal in a manner reducing any difference between the existing voltage amplitude and the predetermined voltage amplitude on the output terminals.

2. A power manipulating apparatus for manipulating an input source of power having a voltage of a predetermined amplitude characteristic into an output power source having a voltage of a different predetermined amplitude characteristic, the apparatus comprising:

a plurality of switching bridge means coupled in series, each bridge means comprising two input terminals coupleable to an input power source, two output terminals on which an output power source in generated, and four switch means for coupling selectively each of the input terminals to each of the output terminals;

means for generating, for each bridge means, first and second control signals representative of a predetermined pattern of switching of the associated four switch means, each of the first and second control signals being associated with two of the switch means and having two states, the means for generating first and second control signals being responsive to a third control signal having two states, with all of the first and second control signals having a third state when the third control signal is in a first state whereby all of the switch means are open, and the first and second control signals are in the first and second states as determined by the means for generating the first and second control signals when the third control signal is in the second state;

switch driver means responsive to the first and second control signals and coupled to each of the switch means, with the switch driver means associated with a first switch means opening the first switch means and the switch driver means associated with the second switch means closing the second switch means when the corresponding one of the first and second control signals is in a first state, and the first switch driver means closing the first switch means and the second switch driver means opening the second switch means when the corresponding one of the first and second control signals is in the second state; and means controllable for generating the third control signal in either the first or second state.

3. An apparatus according to claim 2 wherein the third control signal generating means is responsive to the voltage levels on the input and output terminals for switching the third control signal to the first state when one of the voltage levels exceeds a predetermined value.

4. A power manipulating apparatus for manipulating an input source of power having a voltage of a predetermined amplitude characteristic into an output power source having a voltage of a different predetermined amplitude characteristic, the apparatus comprising:

a plurality of switching bridge means coupled in series, each bridge means comprising two input terminals coupleable to an input power source, two output terminals on which an output power source is generated, and four switch means for coupling selectively each of the input terminals to each of the output terminals;

means for generating, for each bridge means, first and second control signals representative of a predetermined pattern of switching of the associated four switch means, each of the first and second control signals being associated with two of the switch means and having two states, the means for generating the first and second control signals being responsive to a third control signal having two states, with all of the first and second control signals having a third state when the third control signal is in a first state whereby all of the switch means are open, and the first and second control signals are in the first and second states as determined by the means for generating the first and second control signals when the third control signal is in the second state;

switch drive means responsive to the first and second control signals and coupled to each of the switch means, with the switch driver means associated with a first switch means opening the first switch means and the switch driver means associated with the second switch means closing the second switch means when the corresponding one of the first and second control signals is in a first state, and the first switch driver means closing the first switch means and the second switch driver means opening the second switch means when the corresponding one of the first and second control signals is in the second state, at least one switch driver means comprising a diode means for coupling the corresponding control signal to the associated switch means, with each control signal being coupled to the anode of the diode associated with a first of the pair of switches to which the control signal is coupled and coupled to the cathode of the diode associated with the second of the pair of switches to which the control signal is coupled, whereby the same control signal forward biases one of the diodes and reverse biases the other of the diodes when in the first state, and reverse biases the one diode and forward biases the other diode when in the second state; and means controllable for generating the third control signal in either the first or second state.

5. An apparatus according to claim 4 wherein the third state of the first and second control signals is represented by a voltage level whereby neither of the associated diodes is sufficiently forward biased to produce current flow.

* * * * *